May 6, 1930.  C. ALSTRUP ET AL  1,757,852
COLOR SCREEN
Filed Aug. 5, 1927
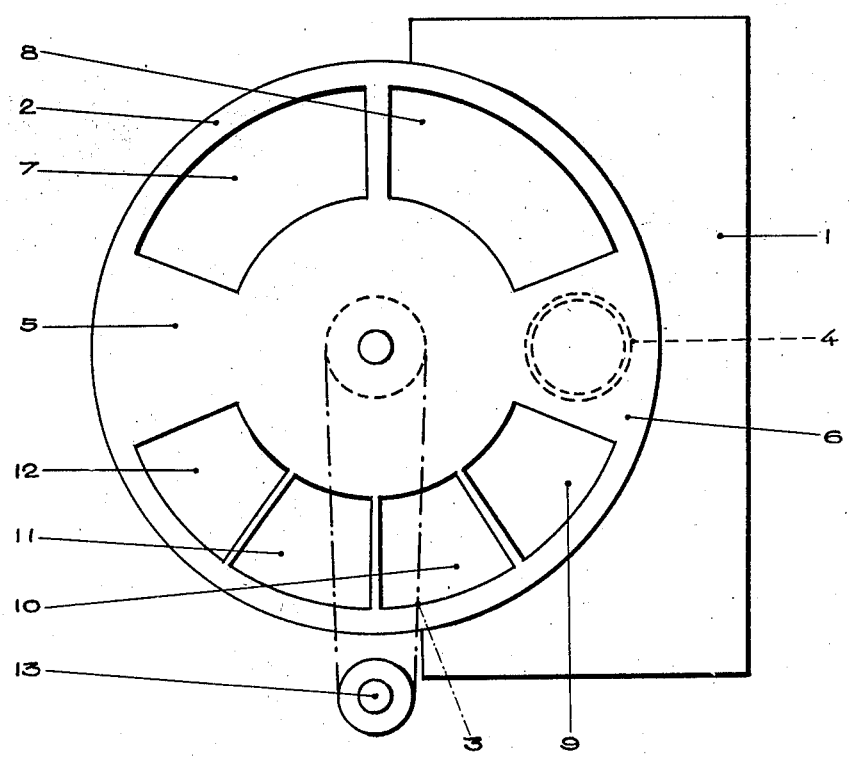
Inventors
Carl Alstrup and
Viggo Jensen
By Marks & Clerk
Attys.

Patented May 6, 1930

1,757,852

UNITED STATES PATENT OFFICE

CARL ALSTRUP AND VIGGO JENSEN, OF COPENHAGEN, DENMARK

COLOR SCREEN

Application filed August 5, 1927, Serial No. 210,930, and in Denmark March 2, 1927.

Our invention relates to process and arrangements for producing still or cinematographic pictures or the like in natural colors as described in our application No. 49,840 filed August 12, 1925.

By working after the process of our said former application it appeared that the melting together of the color impressions is generally the more complete the more color nuances the projected ray beams present. It proved to be rather of importance that the impressions the total effect of which is to cause the conception of a natural, colored image, is produced by as many differently colored ray beams as possible.

The number of differently colored ray beams which may be successively projected during the producing time for a single cinema picture is for practical reasons, a comparatively small one, a pair or generally not more than four. However according to the above new experiences considerably more color nuances, occasionally, up to the double number or still more, are desirable. Hence according to the present invention we follow the way of distributing the total producing time of the differently colored ray beams over the producing time of two or more cinema pictures so that each cinema picture is well illuminated by two or more colors acting in fractions of the producing time in according with our said former application, but in such a manner as to have the total conception of all different color impressions first finished during the producing times of two or more pictures.

As a rule it is of importance that the light filters or the like serving to the production of the differently colored ray beams, are of such a mutual nature, as to have the different projected colors to equally impress the eye.

By our present invention, we prefer to work with ordinary positive and negative films taken through two or more color filters, e. g. in that manner that every second or even numbered picture be taken in a light corresponding to the middle part of the visible spectrum, every second or odd numbered picture in a light of another part.

An arrangement for carrying out the invention is schematically illustrated on the drawing by way of example.

1 is a cinematograph and 2 a color filter disc, occasionally serving also as the shutter of the cinematograph and the speed of which relative to the cinematograph mechanism is such as to perform half a revolution for each picture produced. The moving mechanism of the filter disc is designated with 3 and the producing aperture with 4.

The disc 2 has in each half, besides the shutter segments 5 and 6, a certain number of light filters. A characteristic feature of the present invention is that totally more than four differently colored filters are employed.

In the example illustrated there are for instance two filters 7 and 8 in the one half of the disc, and for instance four filters 9, 10, 11 and 12 in the other half. The filters 7 and 8 through which every second or every odd numbered picture is illuminated or produced, correspond for instance to two or more nuances of lesser refractory light, for instance, dark red and orange. The filters 9, 10, 11 and 12 through which every even numbered picture is illuminated or projected, may for instance have the colors or nuances: yellow, green, blue and violet, or in so far as 12 is concerned, again one of the three first colors or nuances or a middle nuance, or other suitable color combinations may be employed, amongst other depending upon the manner in which the positives or negatives in question have been taken.

Each of the filters 7 and 8 is drawn larger than each of the filters 9 to 12. As a rule we prefer in practice to give the two former as well as the four latter a different tangential extension, especially in order to have the different colors make equal impressions upon the eye as above referred to. Generally the filters corresponding to the color nuances in the middle of the spectrum and being optically highly effective, must be in a suitable proportion tangentially shorter than the filters, corresponding to the limit colors of the spectrum, so that the latter are acting for a comparatively longer time, and consequently their beforehand weaker optical effect is relatively raised to a suitable degree.

For instance the filter 8 may be less than the filter 7, and the filters 9 and 10 especially the former, be less than the filters 11 and 12. If desired the size of the filters may be adjustable by suitable arrangements of the usual mechanical kind.

The segments or filters 7–12 need not be each for itself of one single color-nuance. Each segment may appear as a part of a continuous spectrum, i. e. presenting several or many nuances of the color or colors in question.

The filter disc or the like together with its driving means, for instance the chain 3 is preferably turnably mounted on the shaft 13, so as to be able to be swung through a simple turning movement, from the effective position shown on the drawing, to another position not covering the producing aperture 4.

The filter disc or the like may be positioned either before, or after the objective, or after the film.

We claim:

In an apparatus for producing pictures in natural colors, a rotatable disc having a plurality of color filters and opposed shutter segments dividing the filters into two groups, one group being composed of red and orange filters and the other group of yellow, green, blue and violet filters, the tangential lengths of the red and orange filters being greater than the length of the other filters in proportion to the optical effectiveness of the colors whereby the latter produce equal impressions upon the eye.

CARL ALSTRUP.
VIGGO JENSEN.